(12) United States Patent
Asenjo et al.

(10) Patent No.: US 8,762,149 B2
(45) Date of Patent: Jun. 24, 2014

(54) METHOD FOR VERIFYING THE IDENTITY OF A SPEAKER AND RELATED COMPUTER READABLE MEDIUM AND COMPUTER

(76) Inventors: Marta Sánchez Asenjo, Pozuelo de Alarcón (ES); Alfredo Gutiérrez Navarro, Madrid (ES); Alberto Martín de los Santos de las Heras, Madrid (ES); Marta García Gomar, Móstoles (ES)

( * ) Notice: Subject to any disclaimer, the term of this patent is extended or adjusted under 35 U.S.C. 154(b) by 21 days.

(21) Appl. No.: 12/998,870
(22) PCT Filed: Dec. 10, 2008
(86) PCT No.: PCT/EP2008/010478
§ 371 (c)(1),
(2), (4) Date: Jun. 10, 2011
(87) PCT Pub. No.: WO2010/066269
PCT Pub. Date: Jun. 17, 2010

(65) Prior Publication Data
US 2011/0246198 A1    Oct. 6, 2011

(51) Int. Cl.
*G10L 15/00*    (2013.01)
*G10L 15/06*    (2013.01)
*G10L 21/00*    (2013.01)
*G06F 7/04*    (2006.01)
*G06K 9/00*    (2006.01)
*H04M 15/00*    (2006.01)
*H04M 3/42*    (2006.01)

(52) U.S. Cl.
USPC ........... 704/247; 704/244; 704/246; 704/248; 704/249; 704/270; 726/19; 726/7; 379/114.14; 382/115; 455/415

(58) Field of Classification Search
USPC ......... 704/246, 247, 251, 270, 249, 217, 244, 704/248, 273; 726/19, 7; 379/114.14; 382/115; 455/415
See application file for complete search history.

(56) References Cited

U.S. PATENT DOCUMENTS 5,548,647 A * 8/1996 Naik et al. .................... 704/200
5,897,616 A * 4/1999 Kanevsky et al. ............ 704/246
(Continued)

FOREIGN PATENT DOCUMENTS

EP    0533396    3/1993
GB    2388947    11/2003
(Continued)

OTHER PUBLICATIONS

T. Masukoy and T. Hitotsumatsuy and K. Tokudayy and T. Kobayashiy, on the Security of HMM-Based Speaker Verification Systems Against Imposture Using Synthetic Speech, 1999, In Proceedings of the European Conference on Speech Communication and Technology, pp. 1223-1226.*

*Primary Examiner* — Paras D Shah
*Assistant Examiner* — Neeraj Sharma
(74) *Attorney, Agent, or Firm* — Galvin Patent Law; Brian R. Galvin

(57) ABSTRACT

The present invention refers to a method for verifying the identity of a speaker based on the speakers voice comprising the steps of: a) receiving a voice utterance; b) using biometric voice data to verify (10) that the speakers voice corresponds to the speaker the identity of which is to be verified based on the received voice utterance; and c) verifying (12, 13) that the received voice utterance is not falsified, preferably after having verified the speakers voice; d) accepting (16) the speakers identity to be verified in case that both verification steps give a positive result and not accepting (15) the speakers identity to be verified if any of the verification steps give a negative result. The invention further refers to a corresponding computer readable medium and a computer.

11 Claims, 6 Drawing Sheets

(56) References Cited

U.S. PATENT DOCUMENTS

Figure 1A:
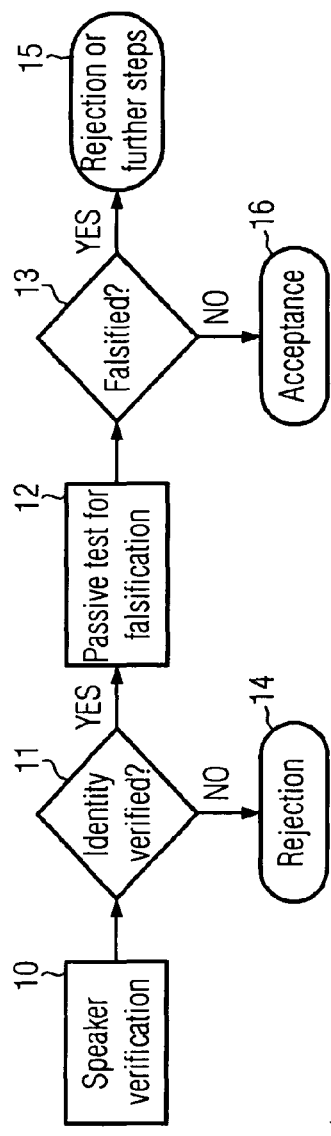

| | | | |
|---|---|---|---|
| 6,067,517 A * | 5/2000 | Bahl et al. | 704/256.4 |
| 6,094,632 A * | 7/2000 | Hattori | 704/239 |
| 6,161,090 A * | 12/2000 | Kanevsky et al. | 704/246 |
| 6,529,871 B1 * | 3/2003 | Kanevsky et al. | 704/246 |
| 6,760,701 B2 * | 7/2004 | Sharma et al. | 704/249 |
| 7,386,105 B2 * | 6/2008 | Wasserblat et al. | 379/114.14 |
| 7,650,281 B1 * | 1/2010 | Cusmariu | 704/243 |
| 8,255,223 B2 * | 8/2012 | Wang | 704/275 |
| 2003/0074201 A1 * | 4/2003 | Grashey et al. | 704/273 |
| 2003/0200447 A1 * | 10/2003 | Sjoblom | 713/186 |
| 2004/0172562 A1 * | 9/2004 | Berger et al. | 713/202 |
| 2005/0182627 A1 * | 8/2005 | Tanaka et al. | 704/248 |
| 2006/0136207 A1 * | 6/2006 | Kim et al. | 704/249 |
| 2006/0286969 A1 * | 12/2006 | Talmor et al. | 455/415 |
| 2006/0293892 A1 * | 12/2006 | Pathuel | 704/246 |
| 2007/0003110 A1 * | 1/2007 | Gutta et al. | 382/115 |
| 2007/0055500 A1 * | 3/2007 | Bilobrov | 704/217 |
| 2008/0172230 A1 * | 7/2008 | Hayakawa | 704/249 |
| 2009/0083850 A1 * | 3/2009 | Fadell et al. | 726/19 |
| 2010/0004931 A1 * | 1/2010 | Ma et al. | 704/244 |
| 2010/0179813 A1 * | 7/2010 | Summerfield et al. | 704/246 |
| 2011/0246198 A1 * | 10/2011 | Asenjo et al. | 704/247 |
| 2012/0130714 A1 * | 5/2012 | Zeljkovic et al. | 704/235 |

FOREIGN PATENT DOCUMENTS

| | | |
|---|---|---|
| GB | 2388947 A * | 11/2003 |
| WO | WO9834216 | 8/1998 |

* cited by examiner

METHOD FOR VERIFYING THE IDENTITY OF A SPEAKER AND RELATED COMPUTER READABLE MEDIUM AND COMPUTER

The present application refers to a method for verifying the identity of a speaker based on the speaker's voice.

Verification of the identity of the speaker is used, for example, for accessing online banking systems or any other system where the identity of the speaker needs to be verified. The verification of the identity of the speaker refers to the situation where someone pretends to have a certain identity, and it needs to be checked that the person indeed has this identity.

Identification of the speaker based on the speaker's voice has particular advantages, since, biometric voice data can be extracted from a speaker's voice with such a degree of accuracy that it is practically impossible by any other speaker to imitate another person's voice with a sufficient degree of accuracy in order to perform fraud.

The object of the present invention is to provide a method and an apparatus, which further increases security of the verification of the identity of a speaker.

According to the method for verifying the identity of a speaker, first a voice utterance is received. This voice utterance is analyzed using biometric voice data to verify that the speaker's voice corresponds to the identity of the speaker that is to be verified. Further one or more steps are performed wherein it is verified that the received voice utterance is not falsified. It may be thought of that the voice utterance may be falsified in the respect that the voice utterance of the identity of the speaker which needs to be verified is recorded and afterwards rendered. This may be done in order to pretend to have a certain identity e.g. to gain access to a system, which is protected by the identity verification. In such a case, the biometric voice data test will positively confirm identity because the voice fits with the pretended identity. Access or any other right, however, shall be denied since it is not the correct person that tries to gain access to a system.

Before the reception of the voice utterance such a voice utterance may be requested within the method. A speaker may for example be requested to pronounce a certain word, number or sentence provided to him within the execution of the method (in the same session) or indicate a password or pass sentence agreed with him beforehand (i.e. before execution of the method).

In order to check the identity of a speaker very elaborated and detailed tests can be carried out which, however, lead to people getting annoyed by extensive and long verification procedures when for example trying to access a system or grant any other right. Such annoying identity verification methods are not practical and, therefore, a way has to be found which, on one hand is convenient for speakers the identity of which needs to be verified, and on the other hand prevents fraud of the identity verification.

The method refers to the step of determining whether the voice utterance is falsified. In those kinds of verifications, it is not determined that the voice is falsified (e.g. by a voice imitator), but whether the voice utterance based on an authentic voice is falsified. A falsified voice utterance in general may be any voice utterance which is not produced in the moment of the identity verification by the person to which the voice belongs but may be for example an utterance which was (e.g. secretly) recorded beforehand and is replayed afterwards for identity verification. Such recording may be done e.g. with a microphone positioned at a certain distance from the speaker (e.g. in the far field, such as more than 10 or 5 centimeter away) or may be located very close to the speaker e.g. in a telephone (typically less than 10 or 5 cm).

Further a falsified voice utterance may be an utterance composed of a plurality of (short) utterances which are composed to a larger utterance, thereby obtaining semantic content which was never recorded. If, for example during recording of a persons voice different numbers or digits are pronounced in a certain order voice utterances corresponding to each digit may be composed in a different order, such that any combination of numbers can be produced which may be requested by the verification system. While in those cases the voice is correct the voice utterance is falsified.

Another possibility of falsification of a voice utterance may be in the case of a synthetically generated voice. A voice generator may be trained or adjusted to imitate a particular kind of voice, such that with such a voice generator a voice utterance may be falsified.

A further option which can be thought of as a way of falsifying a voice utterance may be the case in which a voice utterance stored in a computer system is stolen. A stored voice utterance received e.g. for training or during a previous session may be stored in a computing system, e.g. one used for verifying the identity of a speaker as disclosed herein. If such a voice utterance is stolen, it may be replayed, thereby generating a falsified voice utterance.

In order to have the system as convenient as possible for the speakers, it is preferred that the verification that the voice utterance is not falsified is performed only after the speaker's voice has been verified.

Certain tests such as e.g. a passive test for verifying that the voice utterance is not falsified can, however, also be carried out in parallel once a voice utterance is received for verification of the speakers identity.

In the method, lastly, a step is performed that either accepts a speaker's identity to be verified or does not accept the speaker's identity to be verified. If it can be verified that the speaker's voice corresponds to the speaker, the identity of which is to be verified, and that the voice utterance is not falsified, then the speaker's identity can be accepted to be verified. In this case, for example, access to a protected system may be granted and otherwise denied or further steps can be carried out in order to determine whether indeed the voice utterance is not falsified.

In a preferred embodiment, the received voice utterance is processed in order to determine whether or not it is falsified without processing any other voice utterance. The verification is, therefore, based on the one voice utterance which can be checked for hints that the voice utterance is falsified. In other steps of the verification that the received voice utterance is not falsified, however, other voice utterances may be processed before or after this sub step in which only the received voice utterance is processed.

The specified sub-step refers to the processing without any other voice utterance only up to having come to a previous conclusion whether or not the received voice utterance is falsified. This does not yet need to be the final conclusion thereon.

This kind of check can be part of a passive test for falsification since it does not require any additional input of a speaker during the identity verification session.

In a preferred embodiment any test whether or not the voice utterance is falsified is initially only a passive test, i.e. one which does not require a speaker to provide any additional voice utterance. In case that in this passive test no indication of a falsification is found the speaker is accepted. This is in particular useful for having a method that is convenient for the large number of speakers with no intention of fraud. This, however, requires, that the passive test is capable of detecting many kind of hints, that the voice utterance may be falsified. The passive test therefore in a further preferred embodiment is able to detect different kind of hints that a voice utterance may be falsified.

According to a particular embodiment an active test for falsification which requires additional speaker input, is only carried out in case that the passive test for falsification has given an indication that the voice utterance may be falsified.

In the following some possible checks of a passive test for falsification are explained.

In a check being part of a passive test the recording of the voice in the far field may be detected by determining a speech modulation index from the voice utterance. Thereby additional noise or convolution noise can be identified which can be a hint for recording of the voice utterance in the far field (more than 5 or 10 cm away from the speakers mouth). Further a ratio of signal intensity in two frequency bands one having a lower frequency range than the other can be taken into account for detecting a far field recording. It has been found out that such a ratio provides a helpful indicator of a far field recording since the lower frequency components are usually more enhanced in the far field than in the near field. In a preferred embodiment a combination of the speech modulation index and of a low frequency/high frequency ratio can be used to identify falsifications.

In another check being part of a passive test the prosody may be evaluated in order to check e.g. whether the pronunciation of a word corresponds to its position in a phrase. It can be checked for example whether a word that is at the beginning or end of a sentence is pronounced in such a way. In natural speaking the pronunciation of one and the same word at the beginning, the middle and the end of a sentence is slightly different. These particular pronunciations can be checked by evaluating the prosody. Thereby it is possible to identify e.g. a synthetic voice generator, which usually are not able to provide a natural prosody and on the other hand it may be possible to detect an edited voice utterance wherein smaller pieces of voice utterances are composed to a larger voice utterance.

Further in a check being part of a passive test a voice utterance may be investigated for a certain acoustic watermark. Voice utterances which are stored in a computer system may be provided with acoustic watermarks. Thereby it can be assured that stolen voice utterances can be identified, when trying to identify such acoustic watermarks. An acoustic watermark, may be e.g. a particular signal at a specific frequency or (small) frequency range which does not disturb during replay but which can be identified e.g. by a Fourier analysis providing the particular signal in the specific frequency or frequency range.

Another possible check in a passive test is a check for discontinuities in the background noise. Here for example a background noise profile may be calculated for different time intervals such as e.g. time intervals of 1 to 5 or 2 to 3 seconds and the background noise profile of different time intervals may be compared. If there are major differences this can be an indication of e.g. an edited voice utterance or a far field recording in an ambient with much or changing background noise.

The result of the different checks of a passive test can be combined in different ways. They may for example be combined logically with AND and/or OR operations. Since the different checks usually identify different kinds of falsification they are preferably combined such that if any check indicates that a falsification may be given, the speaker is not accepted directly without prior tests or is not accepted at all.

In a further preferred embodiment a second voice utterance is requested and received. This corresponds to an active test for falsification. The request may be done by any suitable means such as, e.g., a telephone connection by which the first voice utterance was received. The request preferably requests a speaker to repeat the voice utterance received just beforehand. After receiving the second voice utterance, the first voice utterance and the second voice utterance are processed in order to determine an exact match of the two voice utterances. In case that, for example, a voice utterance is falsified by replaying a recorded voice utterance those two voice utterances will match exactly in certain aspects. The exact match of two voice utterances can be determined based on voice utterance specific parameters such as a GMM or any other frequency characteristic which are extracted from each of the voice utterances.

It has been found out that if one and the same person repeats the same text, minor variations are common. This may be due to slightly different pronunciations or due to a distinct background noise. If the voice utterance, however, is replayed from a recorded voice utterance those things do not vary, and hence, trying to determine an exact match is a useful means for identifying that a voice utterance is replayed and indeed is a previously recorded voice utterance.

For the above-mentioned test for an exact match it is, therefore, advantageous that the semantic content of the requested second voice utterance is identical to that of the received voice utterance. The semantic content may, however, be different and only a part of the semantic content is identical and the exact match is determined only for that part.

In the determination of an exact match it is also possible to compare a received voice utterance with a voice utterance that was received during a registration or training phase with that speaker, i.e. before the reception of the voice utterance for the identity verification. If any other person secretly recorded such a voice utterance in order to replay it later on this will be detected. Equally the determination of an exact match may be done with respect to a voice utterance received beforehand in another session of identity verification, but after registration or training, such as e.g. a session in which the identity was verified a few days ago. Such a test for an exact match with a voice utterance received in a previous identity verification session or with a voice utterance received during registration or training may be done also as part of the passive test for falsification mentioned above and below.

In any above or below mentioned test for an exact match it may also be determined that the two voice utterances which are compared, do have at least some degree of similarity in order to avoid a result of a test of an exact match where two voice utterances are completely different e.g. already in there semantic content. The degree of similarity can be determined from characteristics extracted from two voice utterances.

In a possible scenario of fraud it may be tried to synthetically change the second voice utterance, such that it is not exactly equal to the first voice utterance. Such changes may be done for example with addition of white noise. Another possibility is to stretch or compress certain parts of the voice utterance thereby imitating a different prosody. When testing for an exact match different checks for identifying an exact match may be performed. One of those checks may be e.g. able to ignore any added white noise while another check may not be affected by stretching or compressing of the voice utterance. The results of the different checks for an exact match are preferably logically combined e.g. by an OR operation such that any check that indicates an exact match leads to the final conclusion of the test of an exact match.

Further a test for an exact match is preferably combined with an additional test for verification of the speaker based on the second voice utterance. In case that the second voice utterance is synthetically altered the test for the speaker verification may fail since the alterations are to strong. Hence the combination of a speaker verification and of a test for an exact match complement each other in an advantageous way to identify falsified utterances.

In another preferred embodiment the received voice utterance and the second received voice utterance are processed in order to determine an exact match of the two voice utterances or a portion thereof, respectively, and the second voice utterance is additionally processed by a passive test such as in a particular sub-step without processing any other voice utterance or data determined thereof, in order to verify that the second voice utterance is not falsified. Those two processing steps are carried out independently of each other and/or in parallel to each other. This increases processing speed, and therefore, convenience and also accuracy of the verification method since the results of the two tests can be logically combined in order to determine whether or not the voice utterances are falsified. Depending on the result of the two tests, different actions can be taken such as acceptance, rejection or further processing steps.

In a particular advantageous method it is attempted to check for liveliness of the speaker (which is an example of an active test for falsification). Such a test provides for a highly reliable determination whether or not a received voice utterance is falsified or not, but on the other hand, causes much inconvenience for a speaker which is annoying for speakers and undesired for non-fraudulent speakers. In the present method it is, therefore, preferred to have other less annoying tests beforehand, or to have no previous tests beforehand (which would give only less reliable results).

The liveliness of the speaker can be checked, for example, by providing a pool of at least 100, 500, 1,000, 2,000 or 5,000 or more stored sentences which can be forwarded in a suitable manner to the speaker. They can be forwarded, for example, by audio rendition via a telephone connection, or by sending an electronic message by email or SMS or the like. The sentence preferably is a sentence which was not used beforehand during a new registration or training phase of the speaker, which may have been carried out before performing the method for verifying the identity in order to make sure that such a sentence was not yet been spoken by the speaker and, hence, could not have been recorded beforehand.

The selection of the sentence may be done by random. Additionally it may be checked that for one and the same identity which needs to be verified never the same sentence is used twice. After having selected such a sentence, the speaker is requested to speak the selected sentence and a further voice utterance can be received. It is preferred that a sentence comprising a plurality of words such as at least 3, 4 or 5 words is used in order to make sure that such a sentence has never been pronounced by the speaker before.

Upon having received a further voice utterance, first a voice recognition step is performed in order to determine the semantic content of the further voice utterance, with the aim to determine that the semantic content of the received voice utterance corresponds to that of the selected sentence. Here it is to be pointed out that while in the verification of the speakers voice any semantic content is usually suppressed and only individual characteristics of a voice are used which are commonly independent of semantic contact, while, when determining the semantic content any particular characteristics of the voice are to be suppressed in order to determine only the semantic content independent of the voice.

Furthermore, biometric voice data are used to verify that the speaker's voice corresponds to the identity which it is to be verified based on the further voice utterance.

By combining those two tests, it is firstly determined that an alive speaker is presently capable of pronouncing a particular sentence on demand, such that the possibility that the received further voice utterance has been recorded beforehand is minimized and secondly the identity of the speaker is verified based on the same voice utterance.

In further preferred embodiments, it is possible that the different steps are arranged in such a way that the method performs one, two, three or more loops, wherein, in each loop a further voice utterance is requested, received and processed. The processing of such a further received voice utterance preferably has one, two, three or all of a group of sub steps comprising: using biometric voice data to verify that the speaker's voice corresponds to the identity of the speaker, the identity of which is to be verified based on the received further voice utterance; determining exact match of the further received voice utterance with any previously received voice utterance during execution of the method, i.e. in one session (all previously received voice utterances, the lastly received previous voice utterance, the last two previously received voice utterances, etc.), determining the falsification of the further received voice utterance without processing any other voice utterance for this particular sub-step and checking liveliness of the speaker.

Any of the above or below described methods provide a result which is indicative of the speaker being accepted or rejected. This result can be used for granting or denying access to a protected system such as, e.g., a telephone banking system or an online internet based banking access system which can additionally handle voice transmissions.

Other applications of the method are possible as well such as e.g. in a method of informing a person of an event and a method of receiving information about an event such as disclosed in the international application with application number PCT/EP2008/002778.

Further the method may be used in a method of generating a temporarily limited and/or usage limited means and/or status, method of obtaining a temporarily limited and/or usage limited means and/or status such as disclosed in the international application with application number PCT/EP2008/002777.

Also the method may be used in a method for Localizing a Person, System for Localizing a Person such as disclosed in the international application with application number PCT/EP2008/003768.

The text of those three applications in incorporated entirely by reference.

The method is preferably carried out by or implemented in a computer. This computer may be part of a computing system. The computer or computing system may be part of a telephone service system that provides some service such as a telephone banking service, for which access is restricted and the restriction needs to be overcome by identification.

The method may be executed upon an incoming phone call received by a speaker or any other communication capable of transmitting audio data. Such phone call or communication initiates a session for verification of a speakers identity.

The present invention also refers to a computer readable medium having instructions, thereon, which when executed on a computer perform any of the above or below described methods.

Equally, the invention refers to a computer system having such a computer readable medium.

Utterances of the speaker may have been provided before performing the method for verifying the identity of the speaker (in a training or registration phase) in order to evaluate such voice utterances, such that biometric voice data can be extracted thereof. Those biometric voice data can then be used for verification that the speakers voice corresponds to the speaker the identity of which is to be verified.

Biometric voice data may be extracted from a voice utterance by a frequency analysis of the voice. From a voice utterance sequences of, e.g., 20 or 30 milliseconds may be Fourier transformed and from the envelope thereof, biometric voice data can be extracted. From multiple of such Fourier transformed voice sequences a voice model can be generated named a Gaussian Mixed Model (GMM). However, any other voice data that allows distinguishing one voice from another voice due to voice characteristics may be used. Also, voice characteristics that take into account that the voice utterance refers to specific semantic content can be considered. For example, Hidden Markow Models (HMM) may be used which take into account transmission probabilities between different Gaussian Mixed Models, each of which refers to a sound or letter within a word.

Some preferred embodiments of the present invention are disclosed in the figures. Those figures show some examples only, and are not limiting the invention. In the enclosed figures, it is shown in:

FIGS. 1 to 6: specific flow diagrams of a method for performing a method for verifying the identity of a speaker.

Each figure shows certain steps of a session in which the identity of a speaker is verified.

In FIG. 1a, in item 10, speaker verification is performed. In this step, a voice utterance has just been received in the same session and biometric voice data (such as a GMM or a HMM) is used to verify that this speakers voice corresponds to the speaker, the identity of which is to be verified. Speaker verification may be based on data (such as a voice model) which is stored in a database, and which are extracted from voice utterances from speakers during a registration or training phase.

During speaker verification a particular speaker is verified, which means that an identity is assumed and this identity needs to be verified. With the identity information at hand, which can be based, e.g., on a speaker name, a telephone number of an incoming telephone call or the like, the particular biometric voice data is retrieved from a database and is used in processing a received voice utterance in order to verify that the speakers voice corresponds to the speaker the identity of which is to be verified.

The result of the speaker verification leads to a logical result which is positive or negative (yes/no) and indicates whether or not the identity is verified. This is shown in step 11 in FIG. 1a. If the identity is not verified, the speaker is rejected in item 14. If the identity can be verified, it has to be taken into account that the received voice utterance may be falsified, e.g., recorded beforehand. Therefore, in item 12 a passive test for falsification is preformed. A passive test is one which does not need any other voice utterance actively provided by the speaker at that time, but which relies only on the voice utterance received in this speaker verification step 10. Such passive test for falsification is, in particular, advantageous, since no further speaker input is required, which allows for a way to determine whether or not the received voice utterance may be falsified without, however, annoying speakers which are not intending fraud. Since, however, a speaker is accepted directly in case that the passive test 12 does not indicate any suspicion of falsification this passive test preferably is able to check multiple types of falsification. This test therefore may carry out a check for determination of a far field recording, anomalies in the prosody, presence of a watermark, discontinuities in the background, as explained above, or other kind of check. If any check indicates a falsification it will be concluded in step 13 that the voice utterance is falsified.

If no indications can be found that the voice utterance was falsified, the speaker is accepted (see item 16). If it was found out that the voice utterance was falsified, then the speaker may be rejected or further steps may be taken (see item 15). The particular type of action (rejection or further steps) may be made dependent on the kind of passive check that indicated that a voice utterance was falsified. Different checks may work with a different reliability concerning the detection of falsified voice utterances. If a check, that is (very) reliable indicated falsification the user may be rejected directly. If a less reliable check indicates falsification further steps may be taken (as explained above or below such as an active test for falsification) in order to confirm of overrule the finding of a falsified voice utterance.

Figure 1B:
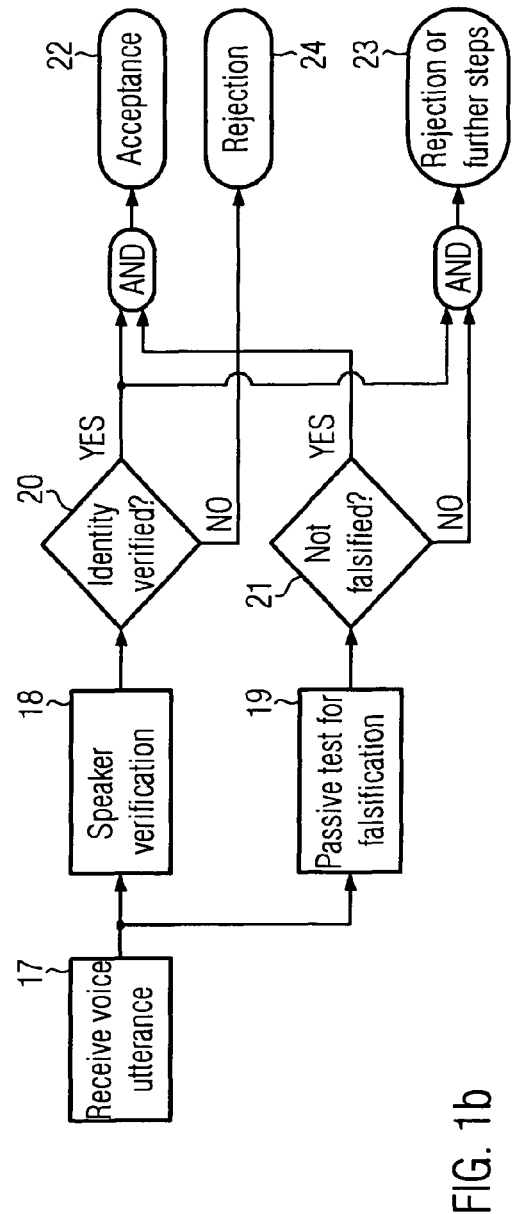

In FIG. 1b an alternative approach is shown in which speaker verification and a passive test for falsification (steps 18 and 19) are performed independently of each other and/or in parallel. Both steps rely on a voice utterance received in step 17, which means one and the same voice utterance. The speaker verification in item 18, and the passive test for falsification in item 19, each of which allows for a decision of whether or not the speaker shall be accepted are logically combined. If both tests result positive, the speaker is accepted (see item 22). If the verification step 20 is negative the speaker is rejected independent of the result of item 21 (see item 24). If in item 20 a positive result is obtained and in item 21 a negative the speaker may be rejected in item 23, or further steps may be taken in order to determine whether or not the speaker is to be accepted or rejected. The particular action taken in step 23 may be made dependent on the particular type of check that indicated falsification in step 19, 21 as explained above for step 15.

Figure 4:
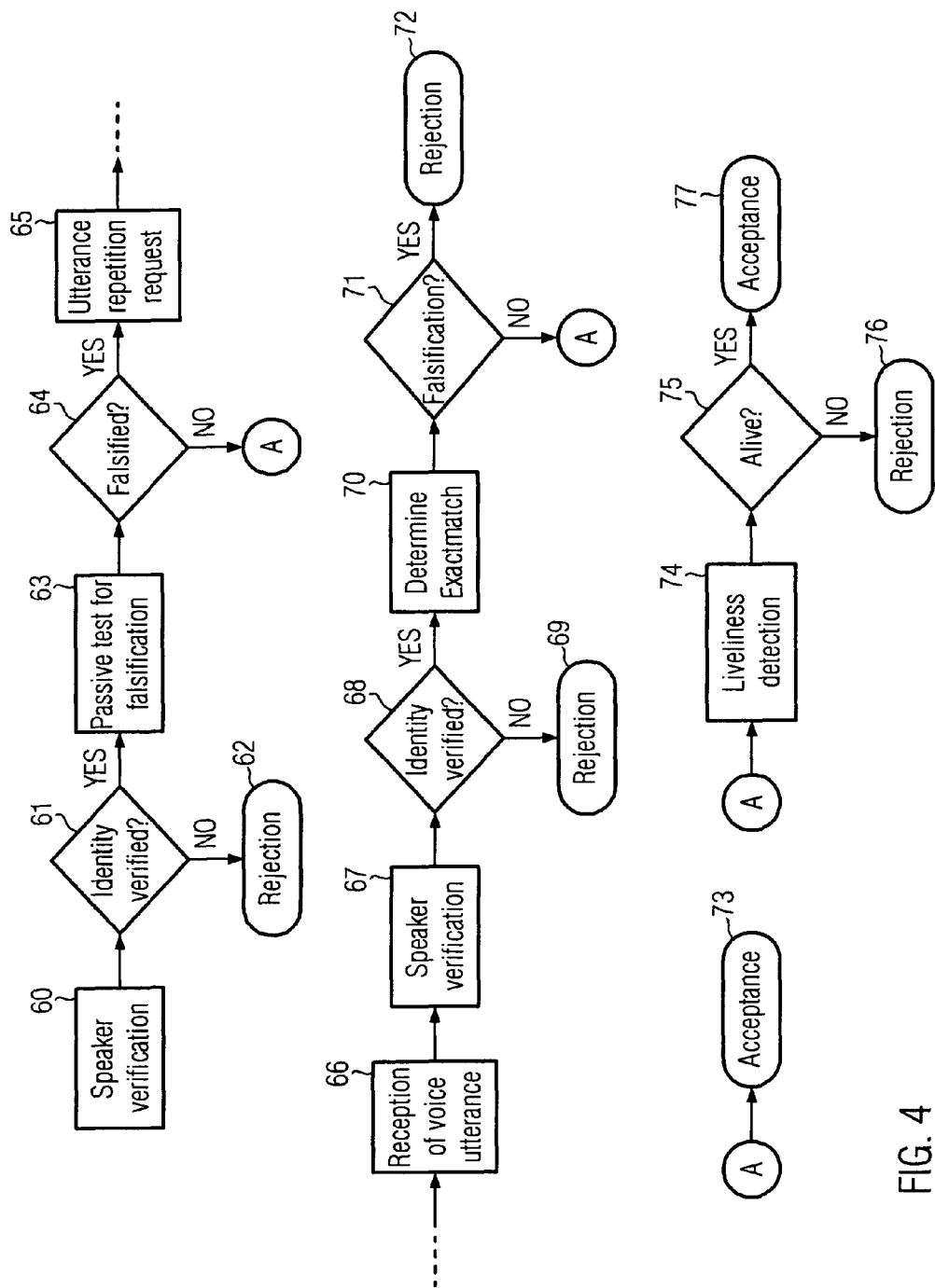
Figure 5:
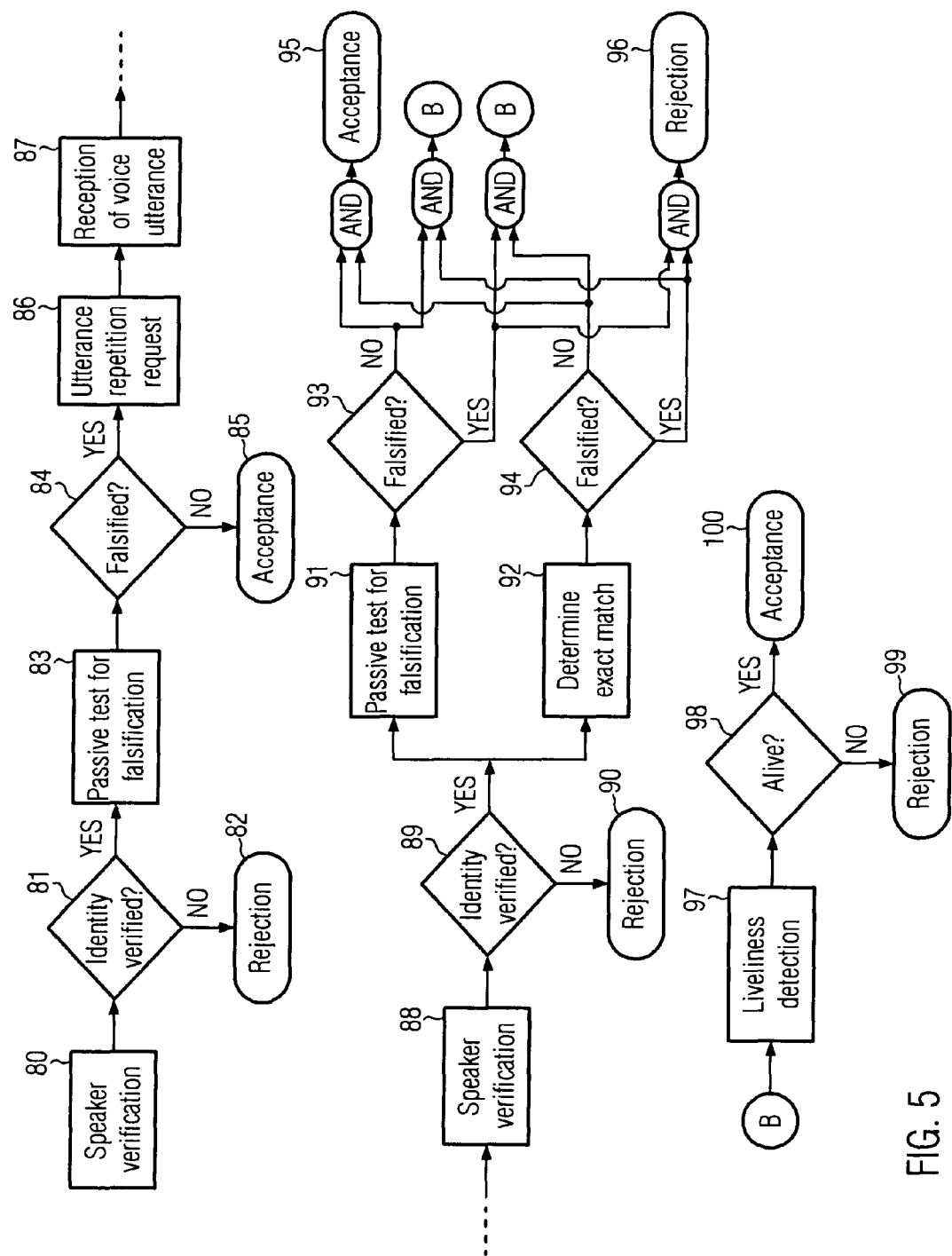
Figure 6:
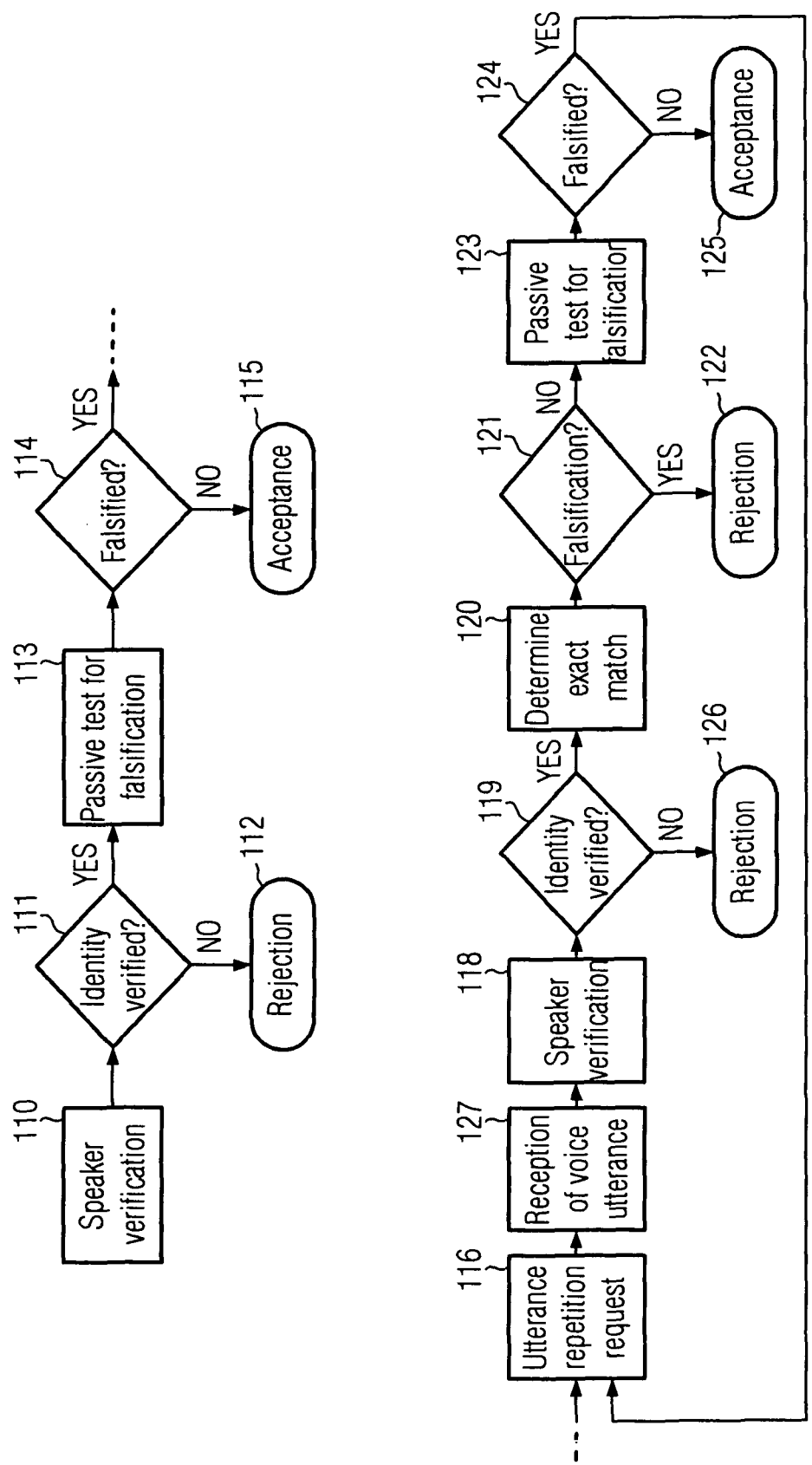

While in FIGS. 4, 5 and 6 the same initial scheme as that of steps 10 to 13 of FIG. 1 is shown those steps may be substituted by steps of FIG. 1b.

Figure 2:
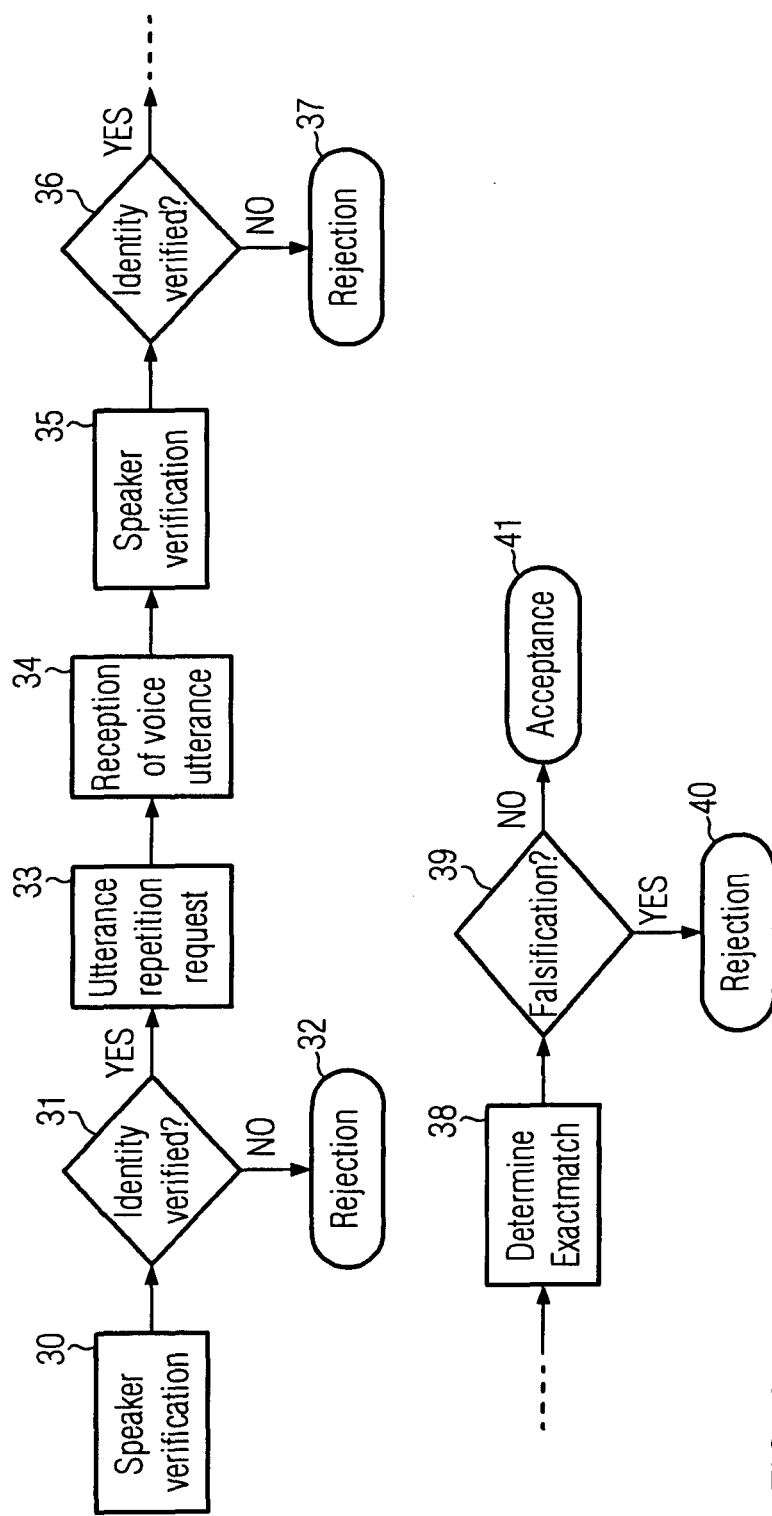

FIG. 2 shows a particular advantageous embodiment, wherein, after speaker verification in item 30 it is decided whether the identity is verified or not in item 31. If the identity is not verified, the speaker is rejected (item 32). If the identity is verified, then before accepting the speaker the speaker is requested to provide a further voice utterance in step 33, which is received in item 34. This voice utterance is again processed for speaker verification in item 35, and if in this step the speakers identity can not be verified, then the speaker is rejected in item 37. If the result of the test in item 36 is positive then it is proceeded to step 38 where it is checked whether or not the two voice utterances received in item 30 and 35 are having an exact match. If this is the case, then in item 39 it is determined that one or both voice utterances are falsified and, hence, the speaker is rejected in item 40. Otherwise he is accepted in item 41.

Such a procedure is more complicated for a speaker since he has to provide at least two voice utterances. It is, however, providing a good degree of certainty for the question of whether or not the voice utterance is falsified. This good degree of certainty comes in particular from the combination of the step of speaker verification of the second voice utterance with determination of an exact match since an attempt to pass by the exact match test by changing the second voice utterance may lead to a rejection by not passing the speaker verification test 35.

Figure 3:
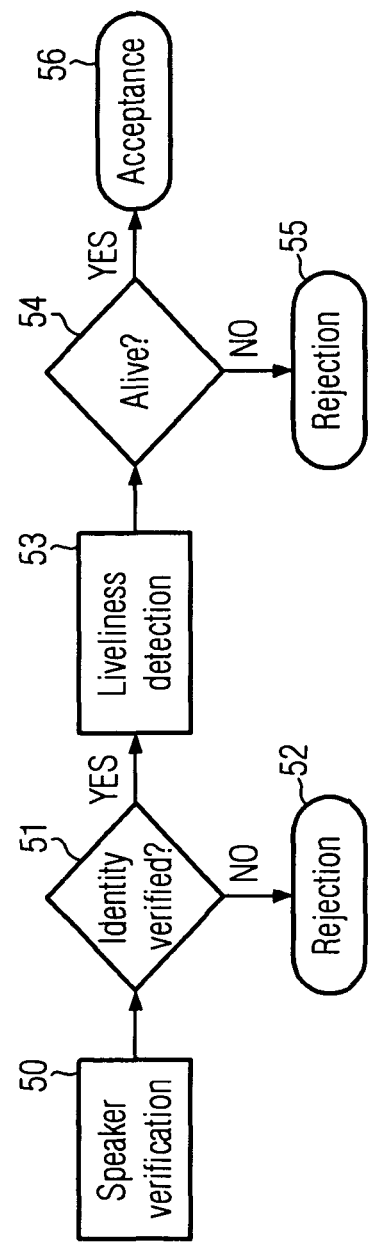

FIG. 3 shows another particular example, wherein, after speaker verification in items 50 and 51 which may lead to the rejection item 52 in item 53 a liveliness detection is performed. Here the liveliness detection is carried out directly after the step of the speaker verification such that no pre-steps are preformed. Liveliness detection may be considered particularly annoying for speakers, since further input from the speaker is required which needs to be provided such that some kind of intelligence on the speakers side can be detected. If in item 54 it is determined that the speaker is alive, he is accepted in item 56 and otherwise rejected in item 55.

In FIG. 4 an example is shown where active tests for falsification are performed after a passive test for falsification. This corresponds to the case where in FIG. 1 in item 15 further steps are taken. In FIG. 4 a speaker is verified in items 60 and 61, and rejected in item 62 in case that the identity can not be verified. If the identity is verified, then the passive test for falsification is carried out in item 63. The result, thereof, is checked in item 64. If it is determined that the voice utterance was not falsified, then the method would proceed to item 73 (see encircled A). If it is found out that the voice utterance may be falsified, then the speaker is not directly rejected, but further steps are taken. In the particular example a further utterance is requested from the speaker in item 65 and received in item 66. This additionally received voice utterance is checked by the speaker verification step in 67. If the identity cannot be additionally verified from this voice utterance, the speaker is rejected in item 69, and otherwise it is proceeded to determine an exact match in item 70. If an exact match is found (see item 71), then the speaker is rejected in item 72, and otherwise it is proceeded to the acceptance 73. In FIG. 4 an alternative for the acceptance step 73 is shown, which indicates that before accepting a speaker a liveliness detection 74 may be carried out. In step 75 it is decided whether or not the speaker is considered to be alive, and then, if this test turns out positive, the speaker is accepted in step 77 and otherwise rejected in step 76.

The voice utterance received in item 66 may be checked for its semantic content. This means that it is checked, that the semantic content of the utterance received in item 66 fits to the semantic content requested in item 65. This test may be done in item 66, 67 or 70. If the semantic content does not fit a speaker may be rejected or the method goes back to step 65 requesting again a voice utterance.

FIG. 5 shows a particular advantageous further example in terms of convenience for speakers and security concerning the identity verification.

In step 80 a speaker is verified based on a received voice utterance received in this step. If in step 81 the identity of the speaker is not verified the speaker is rejected in item 82. In case that the identity is verified first a passive test for falsification 83 is carried out. Since this passive test does not need any additional speaker input, it does not affect convenience of the system for a speaker who is not intending fraud. If in step 84 it is determined that the voice utterance is not falsified, the speaker is taken directly to acceptance 85. In such a case a speaker does not notice any change of the system with respect to introducing the verification step whether or not the received voice utterance is falsified. In case that in step 84 it is determined that the voice utterance is falsified or may be falsified the method proceeds to step 86 where a further utterance by the speaker is requested which is received in step 87. In step 88 this additionally received voice utterance is processed for speaker verification. If the identity of the speaker, which is to be verified, cannot be identified in step 89 the speaker is rejected in step 90.

If the identity can be positively verified, then the method proceeds to steps 91 and 92. Both steps can be carried out in parallel, they may, nevertheless, also be carried out one after the other. It is, however, preferable to carry out the two steps independently of each other, and/or in parallel since then the results of the two tests 91 and 92 can be evaluated in combination. This is shown in FIG. 5, where in steps 93 and 94 each two possible results are achieved, one being positive, and one being negative on the question of whether or not any voice utterance, in particular, the second voice utterance is falsified. If both tests determine that the voice utterance is not falsified, then it is proceeded to acceptance in item 95. In this case, it has to be assumed that the test in step 84 was erroneous.

By performing the passive test for falsification also on the second voice utterance in step 91 it is assured that any hint on falsification present only in the second voice utterance, which may be different from the kind of hint determined in the first voice utterance is identified and taken into account.

If both tests 93 and 94 give a negative result, then it is proceeded to rejection in item 96. In case that the test in step 93 and 94 give contradictory results, then the more profound test can be performed following the B in the circle. Here, additionally, a liveliness detection is performed in step 97, which then leads to the final rejection 99 or acceptance 100 based on the result in item 98.

This embodiment is convenient for a large amount of speakers who do not have any intensions of fraud and which are taken to acceptance 85. For those speakers who are, however, erroneously qualified as using falsified voice utterances in step 84, the group of tests 91 and 92 are carried out in order to be able to reverse the finding of step 84. If, however, no clear decision (acceptance 95 or rejection 96) can be made, then a more advanced test for liveliness detection can be carried out in order to achieve the final decision. In the embodiment of FIG. 5, three different tests or groups of tests (item 84, combined item 93, 94 and item 98) are cascaded in order to obtain a minimum number of false rejections and a high security to determine fraud, while at the same time offering a convenient approach to the majority of speakers.

In the embodiment of FIG. 5 the semantic content of the voice utterance received in item 87 can be checked to see whether or not it fits with the semantic content of the voice utterance requested in item 86. If the semantic content does not fit, the method may reject the speaker or go back to item 86, such that further voice utterance is received.

FIG. 6 shows another particular preferred example, which includes a loop in the method steps. Similarly to steps 80 to 89 steps 110 to 119 are performed. Then, however, a determination of an exact match in item 120 and the evaluation thereof with the possibility of rejection in item 122 is performed in step 121. Thereafter, a passive test for falsification in item 123 is carried out and evaluated in item 124 with the possibility of acceptance in 125. The combination of steps 120 and 121 with the combination of 123 and 124 can also be carried out in the reverse order with steps 123 and 124 performed beforehand. However, the determination of the exact match in item 120 is preferred to be carried out beforehand, such that in any case a rejection in item 122 can be performed in case that an exact match is determined.

If the test 123 gives a positive result concerning the question of falsification, then the method returns to step 116, wherein, a further utterance is requested.

This way a new voice utterance is received, which can be checked as explained beforehand. In case that, for example, two different voice utterance recordings are used in a fraudulent way, then the first determination in item 120 may not indicate falsification in step 121. If then, however, a third voice utterance is received in the second passage of the loop, then the third voice utterance will be an exact match with the first or the second received voice utterance, which may then be determined in step 120. Therefore, in step 120 the determination of an exact match may be performed with respect to the lastly received voice utterance in step 116, with any other previously received voice utterance (in the same session), or the last two, or last three, or last four received voice utterances. In this way, in case that more than one recorded voice utterance is present the same may be used in order to determine an exact match in 120 and to identify falsification in step 121.

As can be seen from FIG. 6 the identification of an exact match leads to rejection. The passive test for falsification in step 123 does not lead directly to a rejection since such test have been found out to be less reliable. Therefore in order to avoid a false rejection the loop is provided, thereby increasing convenience for speakers, by giving them another chance.

The invention claimed is:

1. A method for verifying the identity of a speaker based on the speaker's voice, comprising the steps of:
   a) receiving, at a computer, a voice utterance;
   b) verifying, using the computer, that the speaker's voice corresponds to the speaker the identity of which is to be verified based on the received voice utterance, using biometric voice data;
   c) verifying, using the computer, that the received voice utterance is not falsified, preferably after having verified the speaker's voice in step b) and without requesting any additional voice utterance from the speaker, using the following procedures:
   determining a speech modulation index or a ratio between signal intensity in two different frequency bands, or both, of the received voice utterance preferably to determine a far field recording of a voice;
   evaluating the prosody of the received voice utterance; and
   detecting discontinuities in the background noise; and
   d) accepting the speaker's identity to be verified when both verification steps give a positive result and not accepting the speaker's identity to be verified if any verification steps give a negative result.

2. The method of claim 1, further comprising the steps of:
   (c1) requesting a second voice utterance and receiving a second voice utterance after step (c) of claim 1; and
   (c2) processing the first received voice utterance and the second received voice utterance in order to determine an exact match between the two voice utterances.

3. The method of claim 2, wherein the second received voice utterance is used for verifying that the speaker's voice corresponds to the speaker the identity of which is to be verified, preferably before determining the exact match.

4. The method of claim 3, wherein the semantic content of the second received voice utterance or a portion thereof is identical to that of the first received voice utterance or a portion thereof.

5. The method of claim 4, wherein the first received voice utterance and the second received voice utterance are processed in order to determine an exact match and the second voice utterance is processed by a passive test for falsification without processing any other voice utterance or data determined thereof in order to verify that the second received voice utterance is not falsified, and wherein the two processing steps are carried out independently of each other and the results of the processing steps are logically combined in order to determine whether or not any voice utterance is falsified.

6. The method of claim 1, wherein a logical combination of results of the steps taken in step (c) to detect falsification of a voice utterance is used to decide whether or not to perform a liveliness test of the speaker and wherein preferably a liveliness test of the speaker is performed only when the two processing steps give contradictory results concerning the question whether or not at least the second voice utterance is falsified.

7. The method of claim 6, wherein verifying that the received voice utterance is not falsified further comprises determining liveliness of the speaker.

8. The method of claim 7, wherein liveliness is determined by the steps of:
   (1) selecting a sentence with a system having a pool of at least 100 stored sentences, wherein the sentence preferably is not a sentence used during a registration or training phase of the speaker;
   (2) requesting the speaker to speak the selected sentence;
   (3) receiving a further voice utterance;
   (4) using voice recognition means to determine that the semantic content of the further voice utterance corresponds to that of the selected sentence; and
   (5) using biometric voice data to verify that the speakers voice corresponds to the speaker the identity of which is to be verified based on the further voice utterance.

9. The method of claim 8, wherein the method performs one or more loops, wherein in each loop a further voice utterance is requested, received, and processed, wherein the processing of the further received voice utterance preferably comprises one or more of the following substeps:
   (6) using biometric voice data to verify that the speaker's voice corresponds to the identity of the speaker the identity of which is to be verified based on the received further voice utterance;
   (7) determining an exact match of the further received voice utterance with a previously received voice utterance;
   (8) determining a falsification of the further received voice utterance based on the further received voice utterance without processing any other voice utterance; and
   (9) determining liveliness of the speaker.

10. The method of claim 9, wherein the method provides a result which is indicative of the speaker being accepted or rejected.

11. A computer having software stored and operable thereon that carries out the steps of the method of claim 1.

\* \* \* \* \*